United States Patent
Winton et al.

(10) Patent No.: US 8,754,778 B2
(45) Date of Patent: Jun. 17, 2014

(54) ENERGY SAVING EXIT SIGN RETROFIT LIGHTING SYSTEM USING LIGHT EMITTING DIODES

(76) Inventors: Jeffrey Winton, Chicago, IL (US); Joseph Nowik, Skokie, IL (US); Andrew Rybarski, Bloomingdale, IL (US); Sri Sridharan, Hickory Hills, IL (US)

( * ) Notice: Subject to any disclaimer, the term of this patent is extended or adjusted under 35 U.S.C. 154(b) by 617 days.

(21) Appl. No.: 12/927,679

(22) Filed: Nov. 22, 2010

(65) Prior Publication Data

US 2011/0210861 A1 Sep. 1, 2011

Related U.S. Application Data

(60) Provisional application No. 61/283,126, filed on Nov. 30, 2009.

(51) Int. Cl.
*G08B 5/22* (2006.01)
(52) U.S. Cl.
USPC ...... 340/815.45; 340/476; 340/528; 362/235; 362/240; 362/246; 362/355
(58) Field of Classification Search
USPC ............. 340/815.45, 476, 528; 362/235, 240, 362/246, 355
See application file for complete search history.

(56) References Cited

U.S. PATENT DOCUMENTS

| 5,539,623 | A | | 7/1996 | Gurz et al. | |
|---|---|---|---|---|---|
| 5,542,201 | A | | 8/1996 | Grondal et al. | |
| 5,887,968 | A | * | 3/1999 | Logan | 362/241 |
| 6,499,866 | B1 | | 12/2002 | Logan et al. | |
| 6,553,851 | B1 | | 4/2003 | Carrico et al. | |
| 7,114,840 | B2 | * | 10/2006 | Hamrick | 362/613 |

* cited by examiner

*Primary Examiner* — Tai T Nguyen
(74) *Attorney, Agent, or Firm* — Clifford Kraft (57) ABSTRACT

The present invention relates to an exit sign retrofit lighting system kit including a low profile switch mode power supply contained in internal and external enclosure and use Light Emitting Diodes with long life. The system is powered by a high energy efficient switch mode power supply with low power consumption. The height of this lighting system is very close to half of one inch or less. This kit can be used to save energy in existing Exit Sign fixtures using Tungsten filament lamps or linear fluorescent lamp or compact fluorescent lamp. This kit can be also used with Box type and Edge lit Exit Signs. The long life time of Light Emitting Diodes makes it practically maintenance free, in addition to saving considerable energy.

20 Claims, 11 Drawing Sheets

ENERGY SAVING EXIT SIGN RETROFIT LIGHTING SYSTEM USING LIGHT EMITTING DIODES

BACKGROUND

1. Field of the Invention

The present invention relates to exit sign lighting and more particularly to a retrofit kit for use with two types of existing exit signs.

2. Description of the Prior Art

Presently exit signs run with incandescent lamps or compact fluorescent lamps (CFLs). Incandescent lamps use a lot of power, and the CFLs flicker when being turned on. It would be advantageous to have a retrofit kit that could replace lighting in existing exit signs with LEDs.

SUMMARY OF THE INVENTION

The present invention provides a low voltage, high power factor power supply coupled to arrays of LEDs laid out on a printed circuit board that can be placed into an existing exit sign. The LEDs illuminate the exit template in place of high energy usage tungsten filament lamps or compact fluorescent lamps (CFLs) with very efficient LEDs. The retrofit kit typically includes three parts: a high power factor, constant current isolated power supply; LED arrays; and a set of mounting clips. The clips allow the LEDs to be moved to fit existing signs.

BACKGROUND OF THE INVENTION

The present invention is specifically designed for the replacement of Tungsten filament lamps or Compact Fluorescent lamps also known as CFL lamps like one or two F8T5, PL9W or PL13W.

A light-emitting diode (LED) is a semiconductor device that creates light using solid-state electronics. A diode is composed of a layer of electron rich material separated by a layer of electron deficient material which forms a junction. Power applied to this junction excites the electrons in the electron rich material leading to photon emission and the creation of light. Depending on the chemical composition of the semiconductor layers, the color of light emission will vary within the visible range of electromagnetic spectrum.

LED's are much more energy efficient than their incandescent counterparts for several reasons. LED's produce uniform light dispersion and light output is dispersed evenly over the lens which make them brighter than incandescent lamps. LED's are very energy efficient producing up to 90 percent light output with very little heat while incandescent bulbs use up to 90 percent of their energy generating heat. Incandescent lamps only produce white light which must be filtered for traffic signal use, and this leads to an additional loss in energy. LED's, on the other hand, produce colored light that does not need to be filtered out. All of the energy is concentrated around one color band and none is "wasted" on undesired colors.

The benefits of LED lighting technology include features such as energy savings, long service life, high quality light, and cold temperature operation. In addition to these benefits, LED's do not contain any mercury or lead and have no glass to break.

LED's presently use compound semiconductors. The color of the light is determined by the bandgap of the semiconductor. LED's using AlInGaP compound semiconductor alloys can emit in the yellow-red spectrum, while LED's using AlJnGaN compound semiconductor alloys can emit in the Ultra Violet—blue-green spectrum. A combination of red, green, and blue LED's, or a blue or UV LED with phosphors can be used to create white light.

The Light Emitting Diode emits electromagnetic wave in the visible spectrum of the electromagnetic spectrum.

Figure 9:
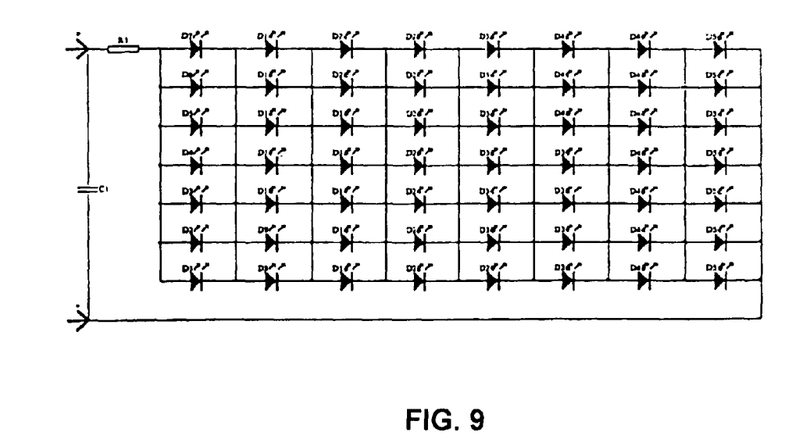
FIG. 9 shows the way in which the Light Emitting Diodes are wired in series and parallel.

The forward voltage and the necessary current are provided by the power supply system. A simple power supply systems provides power for 56 or less Light Emitting Diodes. Typically the LED's are arranged in series and parallel configuration as shown in FIG. 9 and laid out in Printed Wiring Board FIG. 10. Generally there are 2 types of power supplies, magnetic and electronic switch mode. In this lighting system, the switch mode electronic power supply is used for energy efficiency, low profile, light weight, and a high power factor.

While a preferred embodiment has been shown, modifications and changes may become apparent to those skilled in the art which shall fall within the spirit and scope of this invention. It is intended that such modifications and changes be covered by the attached claims.

LED's do not contain mercury and is environment friendly.

The simplicity of the power supply using very few components greatly improves the reliability of this lighting system.

DESCRIPTION OF THE PREFERRED EMBODIMENT

Figure 1:
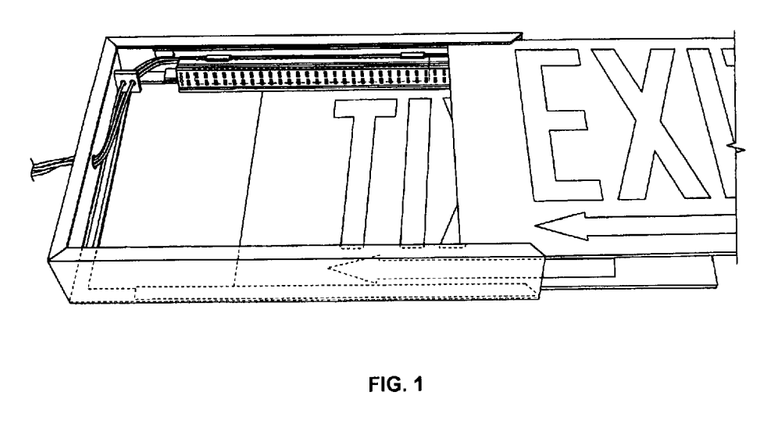
FIG. 1 shows the front view of a double sided Exit sign containing the Retrofit LED kit. The LED driver is mounted inside the LED Fixture. The LED light fixture is mounted at the center for uniform light distribution in the Exit sign.

A preferred embodiment of exit sign lighting system comprising:

a power isolated supply circuit marked as 3 in Annotated FIG. 1 electrically coupled to the LED arrays with a means to provide power to the LEDs in such a manner that the system is characterized by an input power factor of at least 90%.

Figure 10:
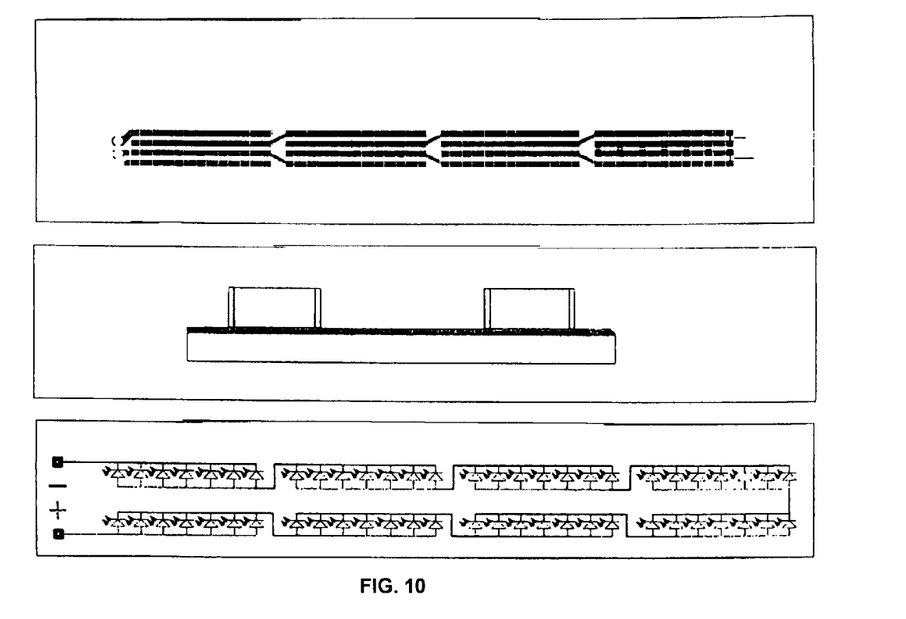
FIG. 10 shows the way in which the Light Emitting Diodes are laid on a printed wiring board for better light distribution.

The lighting system has an array of LEDs connected in series and parallel combination in plural quantity mounted on a printed wiring board as shown in Annotated FIG. 9 *and* Annotated FIG. 10 or the best light distribution.

An aluminum extruded body marked as 1 in Annotated FIG. 1 serves the purpose of holding LED arrays and power supply in position as marked 4 and 3 respectively as shown in Annotated FIG. 1

The LED housing is secured by Quick Connect clips as marked in 2 and 5 in Annotated FIG. 1. The Exit sign indicators slide out through notch marked as 8 and 9 in Annotated FIG. 1. The overall enclosure is marked as 10 in Annotated FIG. 1.

Figure 2:
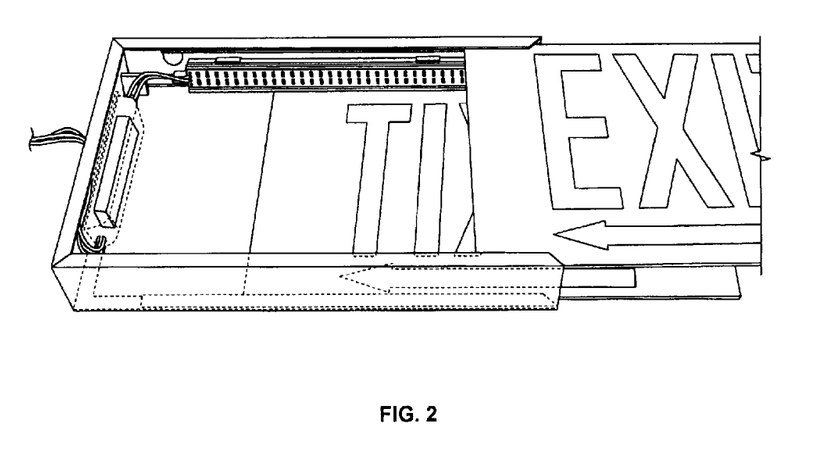
FIG. 2 shows the front view of a double sided Exit sign containing the Retrofit LED kit. The LED driver is mounted external to the LED Fixture on the side as shown. The LED light fixture is mounted at the center for uniform light distribution in the Exit

Annotated FIG. 2 shows an alternate arrangement of Annotated FIG. 1 where the Power supply 13 and its housing 14 are externally connected to the LED board 12.

Figure 3:
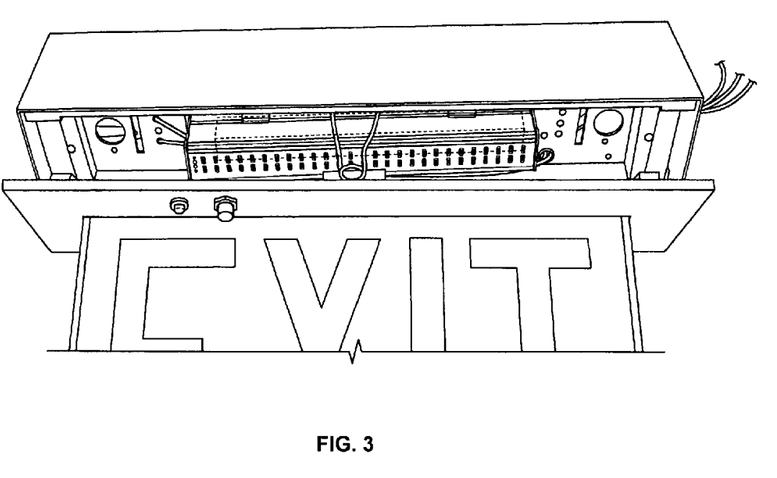
FIG. 3 shows the front view of a Single sided Edge lit Exit sign containing the Retrofit LED kit. The LED driver is mounted inside the LED Fixture. The LED light fixture is mounted at the center for uniform light distribution in the Exit Sign.

Annotated FIG. 3 shows an alternate arrangement of Annotated FIG. 1 where the retrofit kit is used with Edge Lit system. The hosing is marked as 15; input wires are marked as 16, spring loaded locking is marked as 19, the closing cover is marked as 17 and the Exit Sign is marked as 18. The input power to the LED power supply is provided by directly connecting to the input mains by quick connect terminals and wire nuts.

Figure 4:
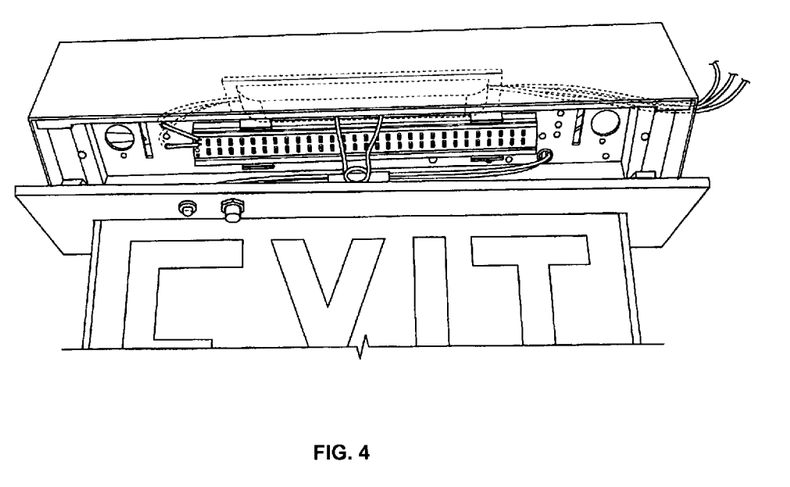
FIG. 4 shows the front view of a Single sided Edge lit Exit sign containing the Retrofit LED kit. The LED driver is mounted outside on the top portion of the Exit sign box container. The LED light fixture is mounted at the center for uniform light distribution in the Exit sign.

Annotated FIG. 4 is an alternate arrangement of Annotated FIG. 3 where the Power supply contained in its enclosure are marked 21 and 22 respectively mounted as shown.

An energy efficient internal low profile, typically about 13 mm height power supply with high power factor to provide the necessary voltage and a predetermined constant current to power the LEDs marked as 14 in FIG. 2. The constant current typically 20 ma. provides uniform light intensity which is very critical.

The LED arrays are so shaped and formed to provide uniform light output in the entire exit fixtures as shown in Annotated FIGS. 1, 2, 3 and 4.

Figure 11:
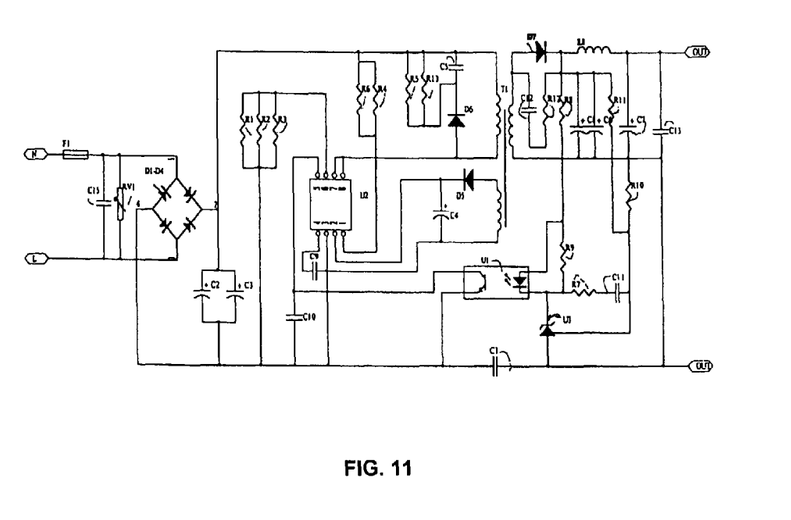
FIG. 11 shows schematic (circuit diagram) of the design of the Light Emitting Diode driver circuit.

An electrical surge protection is provided by the power supply by means of a metal oxide varistor or transorb or gas filled tube or the combination of metal oxide varistor in parallel with a disc capacitor connected across the input power as marked Rv1 in Annotated FIG. 11. This prevents Blow out the EXIT Signs during thunder storms.

This kit can be used to save energy in Exit Sign fixtures described thus far, one for Box light system" as shown in Annotated FIG. 1 and "edge lit" Annotated FIG. 3

Figure 5:
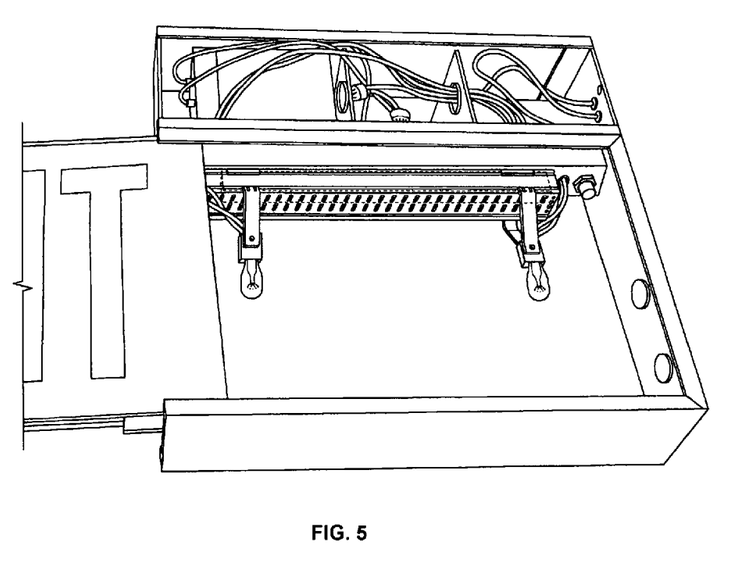
FIG. 5 shows the front view of a double side Exit sign containing the Retrofit LED kit. This has a battery back up system wherein the Battery powers the Low voltage Tungsten Filament lamps under power failure condition. The battery could be mounted any where inside and becomes an integral part of the system. When the power is "ON". the bat~ry gets Trickle charge through a charging circuit The LED light fixture is mounted at the center for uniform light distribution in the Exit Sign. The external gush switch as shown is to simulate the power failure condition to check proper operation under power failure
Figure 6:
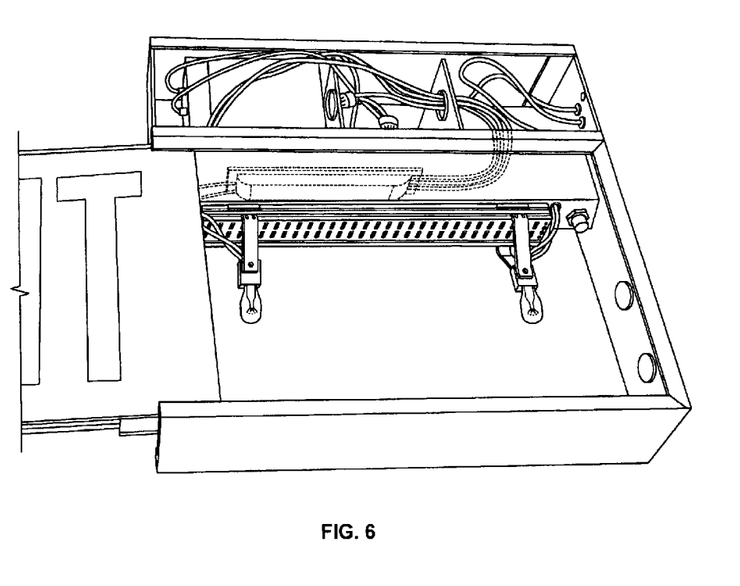
FIG. 6 shows the front view of a double sided Exit sign containing the Retrofit LED kit with an externally mounted LED driver as shown. This has a battery back up system wherein the Battery powers the Low voltage Tungsten Filament lamps under power failure condition. The battery could be mounted any where inside and becomes an integral part of the system. When the power is "ON". the battery gets Trickle charge through a charging circuit The external push switch as shown is to simulate the power failure condition to check proper operation under power failure. The LED light fixture is mounted at the center for uniform light distribution in the Exit.

This kit can also be used in Exit Signs with Battery Backup systems in case of Power Failures. Refer to Annotated FIG. 5 and Annotated FIG. 6. In Annotated FIG. 5, the battery is marked as 22, housing is marked as 23, the LED module with integral power supply marked as 24, interconnections as marked as 25, enclosure is marked as 26, and the Exit sign is marked as 27. Low voltage battery operated tungsten filament lamps are marked as 28 and 29 when there is a power outage. Annotated FIG. 6 is an alternate variation of Annotated FIG. 5 where the power supply is mounted externally as shown. The test switch marked as 34 is used to test the unit by depressing the switch to simulate the power outage.

Figure 7:
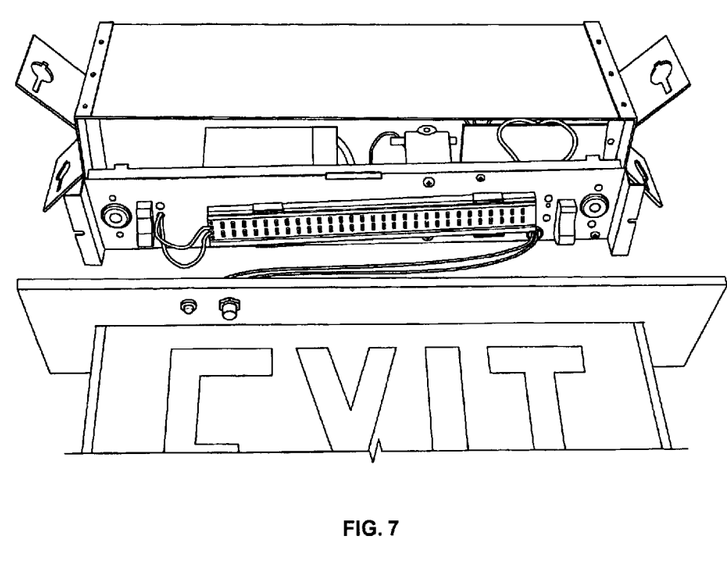
FIG. 7 shows the front view of a double sided Exit sign containing the Retrofit LED kit with an externally mounted LED driver as shown. This has an electronic inverter to convert the low battery voltage to a suitable high voltage, typically about 28 Vdc to power the LED fixture. The inverter also trickle charges the battery when the main power is "ON" The LED light fixture is mounted at the center for uniform light distribution in the Exit. The external push switch as shown is to simulate the power failure condition to check proper operation under power failure
Figure 8:
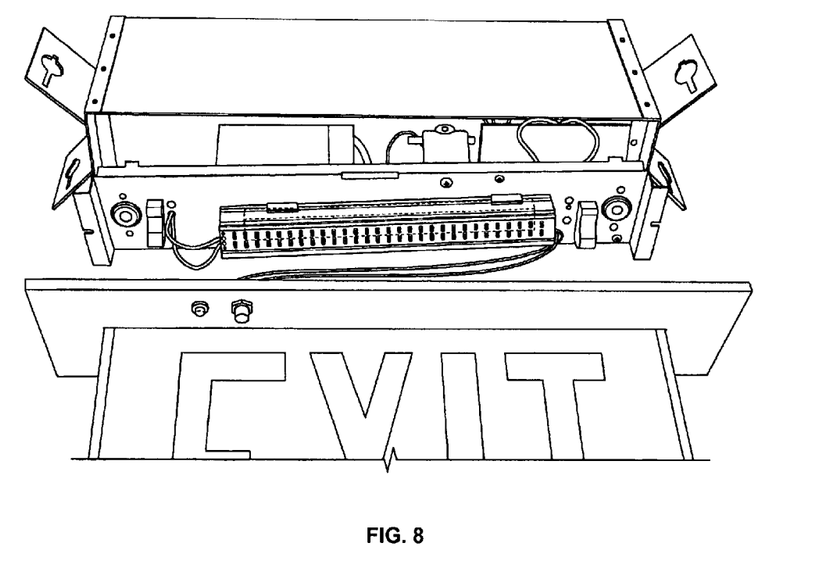
FIG. 8 shows the front view of a double sided Exit sign containing the Retrofit LED kit with an internally mounted LED driver as shown. This has an electronic inverter to convert the low battery voltage to a suitable high voltage, typically about 28 Vdc to power the LED fixture. The inverter also trickle charges the battery when the main power is "ON". The LED light fixture is mounted at the center for uniform light distribution in the Exit. The external push switch as shown is to simulate the power failure condition to check proper operation under power failure.

This kit can be used to save energy in Exit Sign fixtures described in Annotated FIG. 7 where the power supply 37 and its housing 36 are mounted external to the unit. The battery 43 is to couple to the inventor 39 through a transformer 38 in order to boost the low voltage battery to 120 Volt to power the LED Power supply module to power the Exit Sign during the power outage. The button test switch marked as 41 to simulate the power outage condition for testing before installation. Another LED indicator marked as 42 is to indicate the charging of the battery. The enclosure is marked as 40. Annotated FIG. 8 is an alternate arrangement of Annotated FIG. 7 where the LED power supply is integral to the LED power module.

This kit can be used to save energy in Exit Sign fixtures described in Annotated FIG. 7 where the power supply 37 and its housing 36 are mounted external to the unit. The battery 43 is couple to the inverter 39 through a transformer 38 in order to boost the low voltage battery to 120 Volt to power the Led Power supply module to power the Exit Sign during the power outage. The button test switch is marked as 41 to simulate the power outage condition for testing before installation. Another LED 42 is to indicate the charging of the battery The enclosure is marked as 40. Annotated FIG. 8 is an alternate arrangement of Annotated FIG. 7 where the LED power supply is integral to the LED power module.

When used in the Battery Back up system, during the Power Outage the Light Emitting Diodes operate from the Battery power with much less energy thereby prolonging the battery power considerable by staying lit at least for 4 hours offering extra margin of safety exceeding the minimum requirements of 90 minutes required by Underwriters Lab Standard 924

The 56 LEDs put out enough light output to replace linear F8T5 lamp or CFL 9W as shown in FIG. 9 and the layout is shown in Annotated FIG. 10. The number 56 is arbitrary and so chosen to be cost effective. These numbers could change depending on growth LED technology resulting in cost reduction with higher lumens per watt LEDs.

The design of the power supply is so chosen to put out 42 Vdc maximum and still come under Class 2 requirements of Underwriters Lab standards, UL 1310.

Refer to Annotated FIG. 11:

Transformer T1 steps down the high input voltage pulses to low voltage pulses. The power supply has an input stage filter network consisting of a metal oxide varistor, RV1 rated 150V for surge suppression, a safety current limiting fuse, F1 rated ½ A 250 Vac, and an across the line capacitor C15, rated 22 P.Fd. 250V to absorb the transients.

The second stage is a full wave bridge rectifier consisting of four IN4007, D1-D4 diodes, rated 1 Amp. 400V with a filter capacitor rated 4.7M.Fd., 400V.

The third stage feeds the rectified AC voltage to an integrated chip IC1 THX203X contwinder which determines the pulse width after converting the rectified voltage to high frequency chopped voltage.

The diode D7 rated 1 Amp. 400V, rectifies to DC voltage is coupled to resistor R10 rated 5.1 ohms.

The output filter network consists of a resistor R12 rated 10 Ohms coupled to a capacitor C12 rated 680P. Fd., 150V in series coupled to capacitors C8, C6 rated 220M.Fd. 35V to smooth out the ripple voltage. Capacitor C13 rated 104 P.Fd, 50V further smoothes out the output voltage wave shape closer to DC with least amount of ripple. Output choke L1 is coupled between C7 capacitor and diode D7 further stores magnetic energy to provide a constant output voltage.

Resistor R11 and rated 44K ohms with a series choke L2 and a parallel capacitor rated 470M.Fd.25V forms the output filter network.

There is a feed back circuit consisting of resistor R8 rated 38.3K. Ohms coupled to IC2, TL 431A which is an adjustable reference zener diode. This zener is coupled to the power supply through a resistor R10, R11 rated 5.1K Ohms and 44 K ohms respectively.

The turn on reference voltage is determined by R11 and R10 Ohms coupled to capacitors C6, C8 rated 220 M Fd. 50V.

When the output exceeds the set voltage, the IC2 turns on providing a signal to Opto Isolator U1, model PC817 through U3, the adjustable reference zener diode model TL 431 to the pin 9 of the control IC U2 by charging the capacitor C10 rated 22 P Fd, 50V.

Capacitor C9 rated 68 P.Fd. 50V provides the timing frequency for oscillations.

Diode D5 rated, IN 4007 coupled with transformer and capacitor C4 rated 47 M.Fd., 16V provide start up current for the transformer oscillations.

Capacitor C13, rated 10 P.Fd, 50V is coupled to ground to absorb the transient voltages appearing across the output.

Capacitor C7 rated 100 M Fd, 35 V provides necessary filtering of the output voltage to reduce the output ripple.

Refer to Annotated FIG. 11.

The processed signal is fed to the transformer T1 made out of ferrite core with the following construction.

Primary Windings:

Wind 18T on the magnet core EFD15 FROM Pin 1 to Pin 3 by 0.15 mm enamel coated copper wire.

Second Windings:

Wind 135T on the magnet core EFD15 FROM Pin 2 to Pin 4 by 0.2 mm enamel coated copper wire.

Wind 32T on the magnet core EFD15 FROM Pin 8 to Pin 5 by 0.2 mm×3 enamel coated copper wire.

The various methods of mounting are shown in Annotated FIGS. 1, 2, 3, 4 and 5.

What is claimed is:

1. An exit sign lighting retrofit system for a sign with an extruded metal housing having a slide-out notch receiving an exit template comprising:
    a housing that includes a notch for receiving and holding an exit sign template;
    an isolated power supply circuit mounted in said housing electrically coupled to a plurality of LED arrays connected in series said power supply providing power to the LED arrays in such a manner that the system is characterized by an input power factor of at least 90%;
    wherein each LED array contains a plurality of LEDs connected in parallel; and,
    a battery backup electrically coupled to said power supply in an manner where said battery supplies input power to said power supply when line voltage is unavailable, and said power supply trickle charges said battery when line voltage is available; and,
    wherein said LED arrays are positioned in the housing to provide approximately 120 degree light spread.

2. The exit sign lighting retrofit system of claim 1 wherein there are four LED arrays connected in series.

3. The exit sign lighting retrofit system of claim 1 wherein there are seven LEDs in each of said arrays connected in parallel.

4. The exit sign lighting retrofit system of claim 2 wherein there are seven LEDs in each of said arrays connected in parallel.

5. The exit sign lighting retrofit system of claim 1 further comprising a plurality of low voltage incandescent lamps that operate in place of said LED arrays during power outages.

6. The exit sign lighting retrofit system of claim 1 wherein said system can operate for at least 90 minutes during a power outage.

7. The exit sign lighting retrofit system of claim 1 wherein said power supply provides a constant current of approximately 20 mA to said LED arrays.

8. The exit sign lighting retrofit system of claim 1 wherein said housing is secured by quick-connect clamps.

9. The exit sign lighting retrofit system of claim 1 further comprising surge protection circuitry between a line voltage supply input and said power supply.

10. The exit sign lighting retrofit system of claim 1 wherein said LED arrays produce a light temperature output of approximately 5000 degree K.

11. An exit sign lighting retrofit system comprising:
    an isolated power supply circuit electrically coupled to a plurality of LED arrays connected in series said power supply providing power to the LED arrays in such a manner that the system is characterized by an input power factor of at least 90%;
    wherein each LED array contains a plurality of LEDs connected in parallel; and,
    a battery backup electrically coupled to said power supply in an manner where said battery supplies input power to said power supply when line voltage is unavailable, and said power supply trickle charges said battery when line voltage is available; and,
    wherein said LED arrays are positioned in the housing to provide approximately 120 degree light spread;
    wherein said LED arrays produce a light temperature output of approximately 5000 degree K;
    wherein said housing is secured by quick-connect clamps.

12. The exit sign lighting retrofit system of claim 11 further comprising a plurality of low voltage incandescent lamps that operate in place of said LED arrays during power outages.

13. The exit sign lighting retrofit system of claim 11 wherein said system can operate for at least 90 minutes during a power outage.

14. The exit sign lighting retrofit system of claim 11 wherein said power supply provides a constant current of approximately 20 mA to said LED arrays.

15. The exit sign lighting retrofit system of claim 11 wherein said power supply is attached to a housing by quick-connect clamps.

16. The exit sign lighting retrofit system of claim 11 further comprising surge protection circuitry between a line voltage supply input and said power supply.

17. The exit sign lighting retrofit system of claim 11 wherein there are four LED arrays connected in series.

18. The exit sign lighting retrofit system of claim 11 wherein there are seven LEDs in each of said arrays connected in parallel.

19. The exit sign lighting retrofit system of claim 18 wherein there are seven LEDs in each of said arrays connected in parallel.

20. A method for retrofitting an exit sign comprising:
supplying an isolated power supply circuit electrically coupled to a plurality of LED arrays connected in series said power supply providing power to the LED arrays in such a manner that the system is characterized by an input power factor of at least 90%, and wherein each LED array contains a plurality of LEDs connected in parallel; and
supplying a battery backup electrically coupled to said power supply in an manner where said battery supplies input power to said power supply when line voltage is unavailable, and said power supply trickle charges said battery when line voltage is available; and wherein said LED arrays are positioned in the housing to provide approximately 120 degree light spread;
supplying a plurality of low voltage incandescent lamps that operate in place of said LED arrays during power outages.

* * * * *